(No Model.)
W. B. KELLY & H. BOWMAN.
MONKEY WRENCH.
No. 576,855.
Patented Feb. 9, 1897.
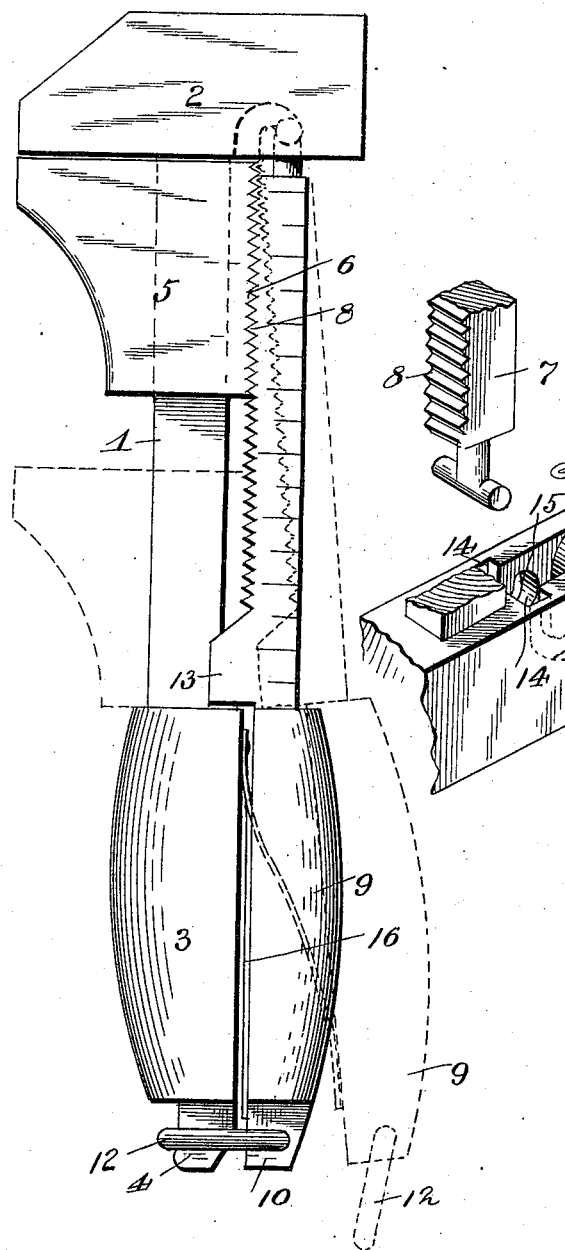
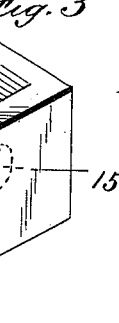
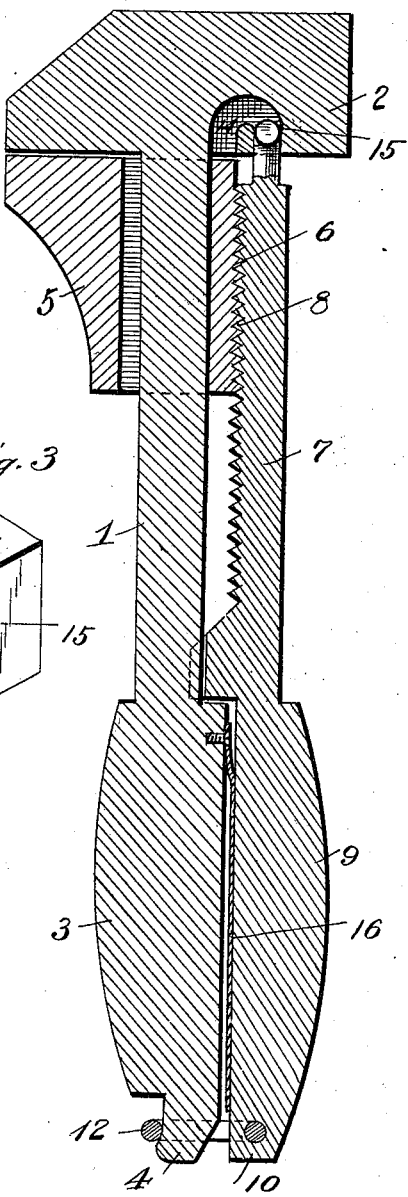
Witnesses:
Franck L. Ourand
Inventors:
Wm. B. Kelly
Henry Bowman
Attorneys.

United States Patent Office.

WILLIAM BUTLER KELLY AND HENRY BOWMAN, OF BARBOURSVILLE, KENTUCKY.

MONKEY-WRENCH.

SPECIFICATION forming part of Letters Patent No. 576,855, dated February 9, 1897.

Application filed September 9, 1896. Serial No. 605,313. (No model.)

*To all whom it may concern:*

Be it known that we, WILLIAM BUTLER KELLY and HENRY BOWMAN, residents of Barboursville, in the county of Knox and State of Kentucky, have invented certain new and useful Improvements in Monkey-Wrenches; and we do hereby declare that the following is a full, clear, and exact description of the invention, which will enable others skilled in the art to which it appertains to make and use the same, reference being had to the accompanying drawings, which form a part of this specification.

Our invention relates to improvements in monkey-wrenches; and its object is to provide an improved construction of the same which shall possess superior advantages with respect to simplicity and economy in construction, facility of adjustment, and efficiency in use.

The invention consists in the novel construction and combination of parts hereinafter fully described and claimed.

In the accompanying drawings, Figure 1 is a side elevation of a monkey-wrench constructed in accordance with our invention. Fig. 2 is a longitudinal section of the same. Fig. 3 is a detail perspective view of the head and pivoted bar.

In the said drawings the reference-numeral 1 designates a rectangular shank, at one end having a fixed jaw 2 and at the other end a handle 3, formed at its extremity with a beveled lug 4.

The numeral 5 designates a sliding jaw having a rectangular opening through which the shank 1 passes and on its inner side is formed with a number of teeth 6. Pivoted to the jaw 2 is a bar 7, having formed on its inner side a number of teeth 8, which engage with the teeth 6. This bar is provided with a handle 9, formed at its extremity with an apertured lug 10, with which is pivotally connected a bail 12, adapted to engage with the lug 4. The bar 7 at the junction therewith of the handle is formed with two parallel lugs 13, which embrace the shank 1 and prevent sidewise movement of the bar on its pivot, which would have a tendency to break or bend the same at the pivotal point. The said stationary jaw is formed with a recess 14, the sides of which are formed with curved slots 15. The bar 7 at its inner end is formed with two outwardly-extending studs, which engage with said slots and hold the bar in place.

The numeral 16 designates a flat spring secured to the handle of shank 1 and pressing against the handle of bar 7.

The operation is as follows: By moving or turning the bar 7 outward on its pivot its teeth will be disengaged from the teeth of the sliding jaw, so that the latter may be moved back or forth to adjust it to the size of nut it is to turn. When so adjusted, the bar and shank are brought together, and the teeth of the nut and bar engaging with each other the jaw will be held in its adjusted position. By engaging the bail with the lug 4 the shank and bar will be held together, so as to keep the teeth in engagement. It will be seen that the inner side of the lug 4 is beveled, so that when the bar and shank are brought together the bail will ride over the bevel so as to engage with the outer side of the lug.

Having thus fully described our invention, what we claim is—

In a monkey-wrench, the combination with the rectangular shank, the fixed jaw having teeth on one side and at one end provided with a recess on its inner side and with intersecting curved slots of the bar having opposite studs engaging with said slots, and provided with teeth adapted to engage with the teeth of said jaw, substantially as described.

In testimony that we claim the foregoing as our own we have hereunto affixed our signatures in presence of two witnesses.

WILLIAM BUTLER KELLY.
HENRY BOWMAN.

Witnesses:
J. R. JONES,
A. W. HOPPER.